United States Patent
Jiao et al.

(10) Patent No.: US 8,319,774 B2
(45) Date of Patent: Nov. 27, 2012

(54) CONSTANT BUFFERING FOR A COMPUTATIONAL CORE OF A PROGRAMMABLE GRAPHICS PROCESSING UNIT

(75) Inventors: Yang (Jeff) Jiao, San Jose, CA (US); Yijung Su, Alviso, CA (US); John Brothers, Calistoga, CA (US)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 13/306,286

(22) Filed: Nov. 29, 2011

(65) Prior Publication Data

US 2012/0069033 A1 Mar. 22, 2012

Related U.S. Application Data

(63) Continuation of application No. 12/062,914, filed on Apr. 4, 2008, now Pat. No. 8,120,608.

(51) Int. Cl.
*G06T 15/00* (2011.01)
(52) U.S. Cl. ........ 345/426; 345/419; 345/522; 341/107; 711/220; 712/216; 717/160
(58) Field of Classification Search .................. 345/419, 345/426, 522; 341/107; 711/220; 712/216; 717/160
See application file for complete search history.

(56) References Cited

U.S. PATENT DOCUMENTS

| | | | |
|---|---|---|---|
| 7,454,599 B2 | 11/2008 | Jiao et al. | |
| 7,656,326 B2 | 2/2010 | Hussain et al. | |
| 7,692,660 B2 | 4/2010 | Markovic et al. | |
| 7,805,589 B2 | 9/2010 | Du et al. | |
| 7,814,468 B1 | 10/2010 | Song et al. | |
| 8,120,608 B2 * | 2/2012 | Jiao et al. | 345/426 |
| 8,144,149 B2 * | 3/2012 | Jiao et al. | 345/426 |

\* cited by examiner

*Primary Examiner* — Phu K Nguyen
(74) *Attorney, Agent, or Firm* — McClure, Qualey & Rodack, LLP

(57) ABSTRACT

Embodiments of the present disclosure are directed to graphics processing systems, comprising: a plurality of execution units, wherein one of the execution units is configurable to process a thread corresponding to a rendering context, wherein the rendering context comprises a plurality of constants with a priority level; a constant buffer configurable to store the constants of the rendering context into a plurality of slot in a physical storage space; and an execution unit control unit configurable to assign the thread to one of the execution units; a constant buffer control unit providing a translation table for the rendering context to map the corresponding constants into the slots of the physical storage space. Comparable methods are also disclosed.

15 Claims, 9 Drawing Sheets

CONSTANT BUFFERING FOR A COMPUTATIONAL CORE OF A PROGRAMMABLE GRAPHICS PROCESSING UNIT

CROSS-REFERENCE TO RELATED APPLICATION

The present application is a continuation of U.S. application Ser. No. 12/062,914, filed Apr. 4, 2008, the contents of which are incorporated herein by reference.

TECHNICAL FIELD

The present disclosure is generally related to data processing systems, and more particularly, is related to programmable graphics processing systems and methods.

BACKGROUND

Computer graphics is the art and science of generating pictures, images, or other graphical or pictorial information with a computer. Generation of the pictures or images is commonly called rendering. Generally, in three-dimensional (3D) computer graphics, geometry that represents surfaces (or volumes) of objects in a scene is translated into pixels (picture elements), stored in a frame buffer, and then displayed on a display device.

Several different coordinate spaces will be used to transform an object in a scene to an image shown on a display. For instance, an object may commence from a model space where transformations have yet to occur. From the model space, vertices and normals of the object may be positioned and oriented through the use of one or more model transforms, resulting in a transformation into world space or world coordinates. Further, a view transform is applied to the models having world coordinates to define the position and orientation with respect to a camera position. The resulting space, often referred to as eye space or camera space, may facilitate various operations, such as projection and clipping functionality, as well as further transformations.

These further transformations from eye space may include the use of programmable shader programs, such as a vertex shader, pixel shader, and/or geometry shader, to be executed in a pool of parallel, multi-threaded execution units forming a computational core of a graphics processing unit (GPU). A shader generally refers to a program used in 3-dimensional (3D) computer graphics that may be used to determine the final surface properties of an object or image. Each object or group of objects may have specific visual properties related to the appearance of surfaces (e.g., materials, reflectance, shape, textures, etc.) and/or operations related to the same (e.g., required transformations) which may collectively be referred to as a rendering context for this object or group of objects. When rendering an object or group of objects for a given rendering context, a shader utilizes a constant data pool (e.g., context-specific constants stored in a constant buffer).

For instance, a vertex shader is generally applied to each vertex and runs on a programmable vertex processor. The vertex shader may define a method to compute vector space transformations and perform other computations. In computing the vector space transformations, various constants may be used. For instance, vertices (x, y, z, w) may be transformed to new vertices (x', y', z', w') through the use of a matrix (e.g., 4×4 matrix) of constants (e.g., $C_{00}, C_{01}, C_{02}, C_{03}, \ldots C_{33}$). These constants are typically stored in a constant buffer corresponding to a respective execution unit, the constants related to the rendering context of one or more 3D objects.

One challenge to existing systems occurs in regard to the frequent updating of at least a portion of the constants in the constant buffer due to rendering of the sequence of objects with different visual properties defined in an appropriate rendering context. In general, an update of constants requires "flushing" the entire constant buffer having the "old" context related data and loading "new" constants corresponding to a new context.

Further, the execution unit corresponding to the constant buffer, which may be running a plurality of threads, may be stalled during the flushing of the constant buffer. That is, the execution unit may flush the threads (e.g., to allow completion of processing using the previous constants) before execution using the set of new constants can commence. Thus, such rendering context switching (e.g., from a first context to a second context) in the shader running on a multi-threaded computational core may cause significant performance penalties.

SUMMARY

Embodiments of the present disclosure are directed to graphics processing systems, comprising: a plurality of execution units, wherein one of the execution units is configurable to process a thread corresponding to a rendering context, wherein the rendering context comprises a plurality of constants with a priority level; a constant buffer configurable to store the constants of the rendering context into a plurality of slot in a physical storage space; and an execution unit control unit configurable to assign the thread to one of the execution units; a constant buffer control unit providing a translation table for the rendering context to map the corresponding constants into the slots of the physical storage space.

Embodiments of the present disclosure are directed to methods for managing constant buffer in a graphics processing unit, comprising: receiving a plurality of shader operations by the graphics processing unit, each of the shader operations is corresponsive to a rendering context, wherein the rendering context comprises a plurality of constant; translating the graphics shader operations into a plurality of threads by the graphics processing unit, each thread is executable by the graphics processing unit; transmitting the constants into a physical storage space of the graphics processing unit; generating a translation table for the rendering context to map the constants into the physical storage space of the graphics processing unit by the graphics processing unit; and executing the threads by the graphics processing unit, wherein the constants necessary for the execution of the threads are accessible from the physical through the translation table.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure.

BRIEF DESCRIPTION OF THE DRAWINGS

Many aspects of the constant buffer systems and methods described herein can be better understood with reference to the following drawings. The components in the drawings are not necessarily to scale, emphasis instead being placed upon clearly illustrating the principles of the systems and methods. Moreover, in the drawings, like reference numerals designate corresponding parts throughout the several views.

DETAILED DESCRIPTION

Figure 1:
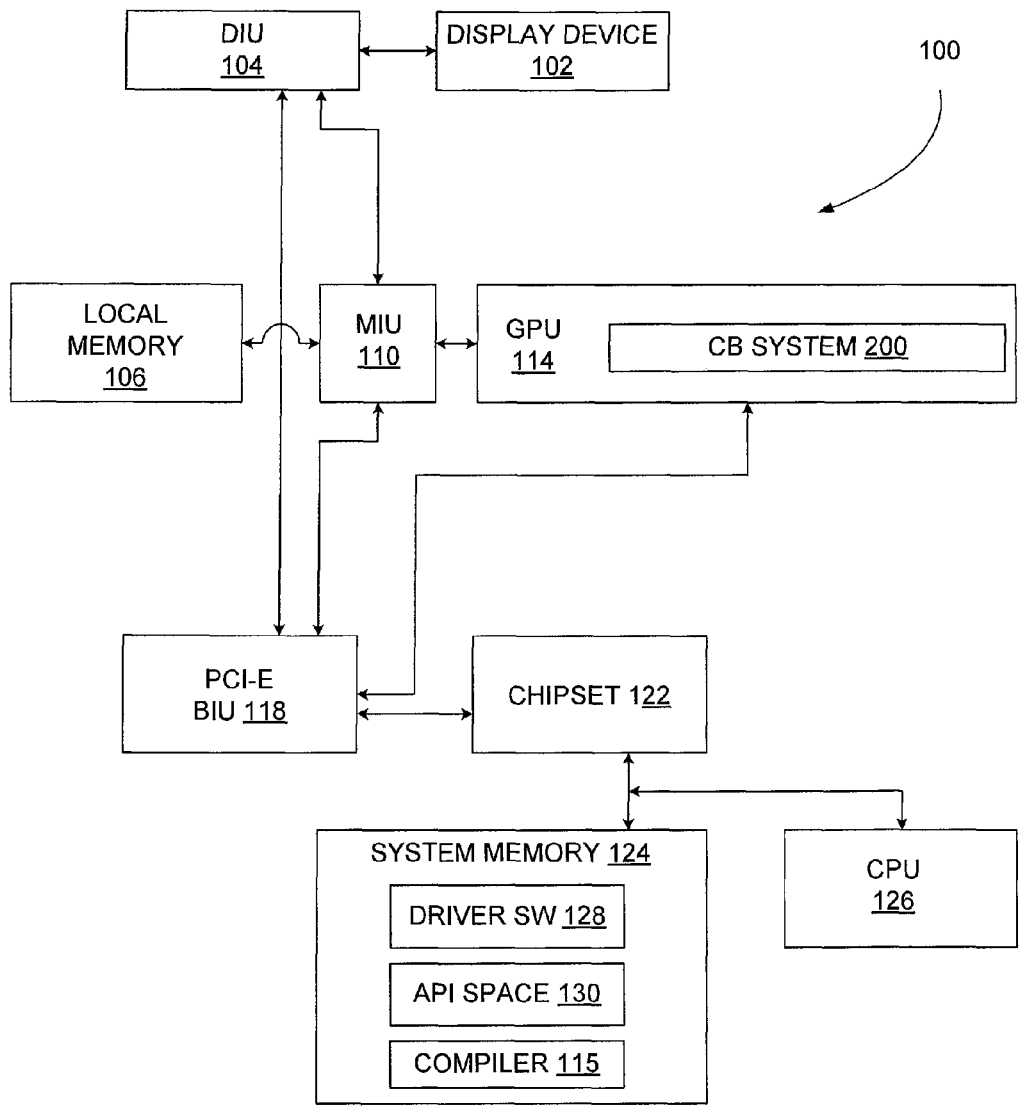
FIG. 1 is a block diagram an embodiment of a graphics processor system in which embodiments of constant buffer (CB) systems and methods are implemented.

Disclosed herein are various embodiments of constant buffer (CB) systems and methods (herein, also collectively constant buffer system(s) or CB system(s)) implemented in each execution unit of a multi-threaded, parallel computational core of a graphics processing unit (GPU). A CB system enables the updating of a constant buffer with new context data related to a new rendered object while current or existing context data in the buffer is being used by shader program threads rendering a previous object. Such updating of the constant buffer occurs without stalling the computational core execution units for reload of constants. That is, as compared to existing systems that flush the constant buffer with each rendering context change (flush the "old" constants entirely from the buffer to make room to load new constants), the CB system enables the simultaneous processing of constants using the same or different shader from more than one rendering context.

Thus, unlike conventional systems, changes to constants in the preferred embodiments do not impose a penalty in speed and efficiency. In particular, the below described CB systems enable updates or changes to constants to occur while enabling execution of previous constants. That is, execution of shader programs with constants of a different context occurs in simultaneous paths, with one path corresponding to the previous context constants and at least one other path corresponding to the new context constants. The updating or replacement of constants through implementation of the various CB system embodiments enables a smooth procedure of constant replacement in shader execution blocks, which may result in an improvement in computational efficiency.

A rendering context generally refers to specific visual properties for one or more objects, for instance the appearance of surfaces (e.g., materials, reflectance, shape, textures, etc.) and/or operations related to the same (e.g., required transformations). Processing for a rendering context involves execution by a shader (e.g., shader threads) utilizing a group of constants. A change in rendering context may involve the same shader operating on a different group of constants, or a different shader operating on a different group of constants. The constants are used by various shader programs to perform computations, such as transformations, lighting, skinning, among other computations. Each constant is identified by the shader using a corresponding rendering context identifier (ID), enabling constants for more than one context to be maintained in the constant buffer and used by shader programs running on the respective execution unit.

In one embodiment, a CB system includes a constant buffer, constant buffer controller, and multi-context address translation tables. As further explained below, the constant buffer comprises data slots of predetermined size for constants corresponding to one or more rendering contexts, including current constants and updated or new constants. The constant buffer controller maintains a logical index of constants for each rendering context using the context address translation tables. That is, the constant buffer controller matches the shader reference to a constant for a given rendering context (e.g., as identified by a context ID) with a physical address in the constant buffer. Such a configuration avoids the need to overwrite an address space or stall execution when data for more than one context exists in the constant buffer.

Additional features of certain embodiments of the constant buffer systems and methods include updating the shader constant buffer with new context data related to a new rendered object while the current context data in the constant buffer is being used by shader program threads rendering previous object without stalling computational core execution units for constant reload; mapping constants related to different contexts from applications programming interface (API) program tokens to a graphics processing unit (GPU) memory and the internal on-chip constant buffer; managing constant fetches to the constant buffer for a first context; managing constant fetches to the constant buffer for a second context if there is enough space (available constant blocks) in the internal constant buffer; monitoring of constant usage status and creating a list (e.g., table) of free constant buffer blocks for allocation of new upcoming context constants; and allocation of new constants in constant buffer slots and updating of context address translation tables providing access to constants from one or more shader programs running in the computational core of the GPU.

A general description of an exemplary environment of a graphics processor system and its corresponding components is described below, with the understanding that the disclosed systems and methods may be extended to other processing environments.

FIG. 1 is a block diagram of an embodiment of a graphics processor system 100 in which embodiments of CB systems and methods (collectively, constant buffer (CB) system 200) are implemented. As is described further below, the CB system 200 is incorporated in each execution unit of a computational core. In some implementations, the graphics processor system 100 may be configured as a computer system. The graphics processor system 100 may comprise a display device 102 driven by a display interface unit (DIU) 104 and local memory 106 (e.g., which may comprise a display buffer, frame buffer, texture buffer, command buffer, etc.). Local memory 106 may also be referred to interchangeably herein as a frame buffer or storage unit. Local memory 106 is coupled to a graphics processing unit (GPU) 114 through one or more memory interface units (MIU) 110. The MIU 110, GPU 114, and DIU 104 are coupled in one embodiment to a peripheral component interconnect express (PCIE) compatible bus interface unit (BIU) 118. In one embodiment, the BIU 118 may employ a graphics address remapping table (GART), although other memory mapping mechanisms may be employed. The GPU 114 includes the CB system 200, as described below. Although shown as a component of the GPU 114, in some embodiments, the CB system 200 may include one or more additional components of the graphics processor system 100 that are shown, or different components.

The BIU 118 is coupled to a chipset 122 (e.g., north bridge chipset) or switch. The chipset 122 comprises interface electronics to strengthen signals from a central processing unit (CPU) 126 (also referred to herein as a host processor) and to separate signals to and from a system memory 124 from those signals going to and from input/output (I/O) devices (not shown). Although a PCIE bus protocol is described, other manners of connection and/or communication between the host processor 126 and the GPU 114 may be implemented in some embodiments (e.g., PCI, proprietary high-speed bus, etc.). The system memory 124 also comprises driver software 128, which communicates instruction sets or commands through the use of the CPU 126 to registers in the GPU 114, and an applications programming interface (API) space 130, from which constants are either memory mapped or constant buffer mapped by a compiler 115 in the GPU 114, as explained further below.

Additional graphics processing units may be employed in some embodiments, coupled for instance to the components shown in FIG. 1 through the chipset 122 via a PCIE bus protocol among others. In one embodiment, the graphics processor system 100 may embody all of the components shown in FIG. 1, or in some embodiments, fewer and/or different components than those shown in FIG. 1. Further, in some embodiments, additional components may be used, such as a south bridge chipset coupled to the chipset 122.

Figure 2:
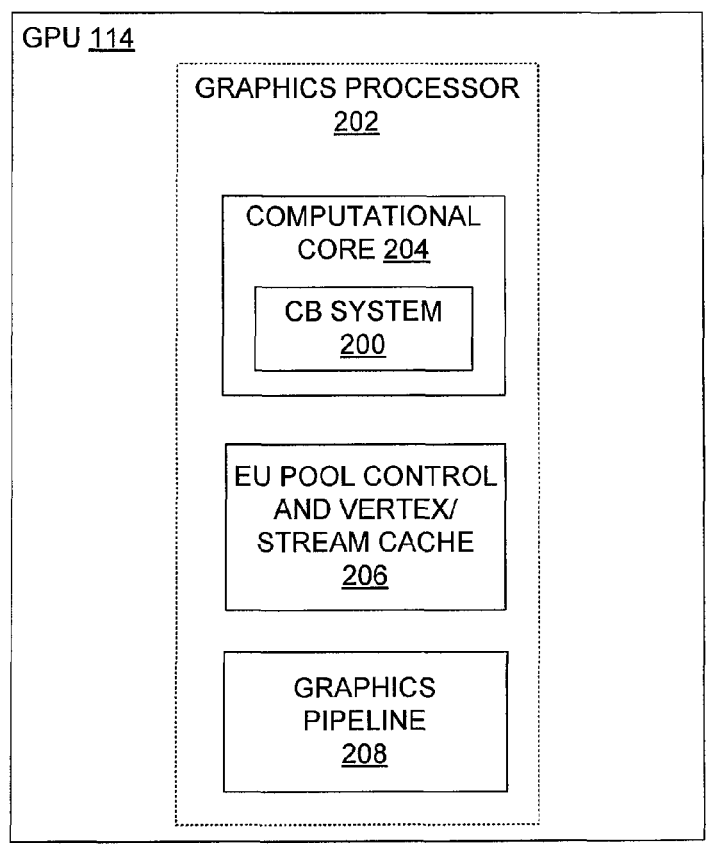
FIG. 2 is a block diagram that illustrates an exemplary processing environment in which a CB system embodiment is implemented.

Reference is now made to FIG. 2, which is a block diagram that illustrates an exemplary processing environment in which an embodiment of a CB system 200 is implemented. In particular, the GPU 114 is shown, and includes a graphics processor 202. The graphics processor 202 comprises the compiler 115, a multiple execution unit (EU), computational core 204 (also known as a software programmable core processing unit) that, in one embodiment, comprises the CB system 200 distributed among one or more execution units. The graphics processor 202 also comprises an execution unit pool (EUP) control and vertex/stream cache unit 206 (herein, EU pool control unit 206) and a graphics pipeline with fixed function logic 208 (e.g., including a triangle set-up unit (TSU), span-tile generator (STG), etc.) as explained below. The computational core 204 comprises a pool of multiple execution units to meet the computing requirements imposed by shader tasks associated with various shader programs, including a vertex shader, geometry shader, and/or pixel shader, processing data for the graphics pipeline 208. As the functionality of the CB system 200 in one embodiment is implemented largely through cooperation with one or more shaders of the computational core 204, a general description of an embodiment of a graphics processor 202 is described, followed by the particulars of certain embodiments of the CB system 200.

The CB system 200 can be implemented in hardware, software, firmware, or a combination thereof. In the preferred embodiment(s), the CB system 200 is implemented in hardware and firmware, including any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
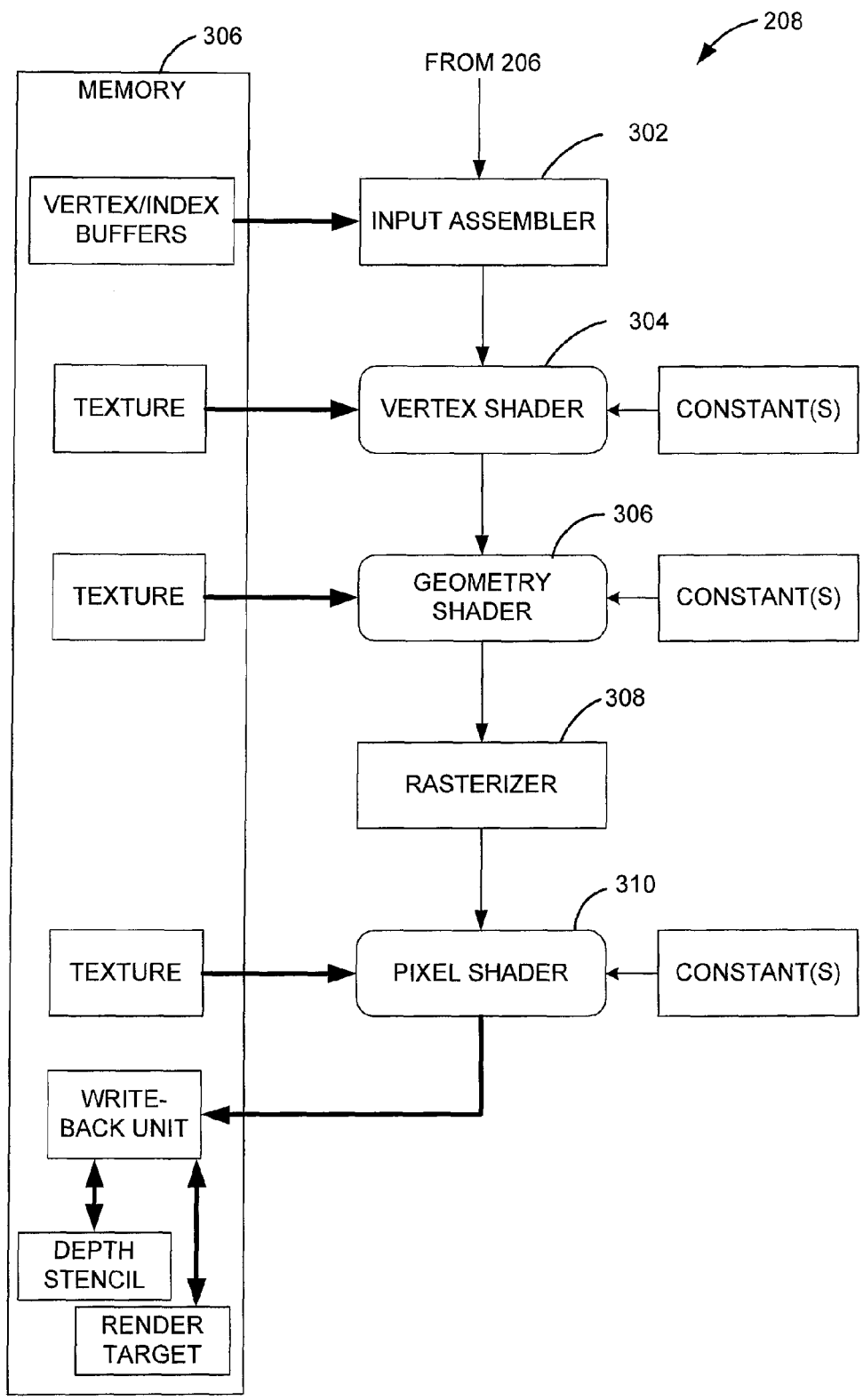
FIG. 3 is a block diagram that illustrates a logical graphics pipeline portion of the exemplary processing environment shown in FIG. 2.

FIG. 3 is a block diagram that illustrates an embodiment of the logical graphics pipeline 208. Additional or fewer components to those shown in FIG. 3 may also be included in some embodiments. For instance, each module described below may have its own internal register or registers, not shown, used by a module co-located with the register or shared with different modules. Additionally, various caches (e.g., depth or z-cache, color or D-cache, texture or T-cache, etc.) may be implemented according to well-known pipeline architectures. Specifically, the components illustrated in FIG. 3 comprise principle components of a graphics pipeline 208 that cooperate, in whole or in part, with the CB system 200. The first component is designated as an input assembler 302, which essentially fetches (or generally receives) all vertex data from the memory 312 using index buffers, and assembles primitives for further processing in the computational core 204. Memory 306 comprises local memory 106, among other memory subsystems such as the stream and vertex cache of the pool control unit 206 (e.g., the latter used as a source of vertex data for assembling geometry primitives). The primitives, once assembled, are passed to the vertex shader 304. The vertex shader 304, as is known, processes vertices, by performing operations such as transformations, skinning, and lighting. Constants for performing one or more of the aforementioned computations are provided by a constant buffer of the constant buffer system 200, as pre-loaded by special commands generated during compilation by compiler 115. Thereafter, the vertex shader 304 passes data to the geometry shader 306. The geometry shader 306 receives, as inputs, vertices for a full primitive, and is capable of outputting multiple vertices that form a single topology, such as a triangle strip, a line strip, point list, etc. The geometry shader 306 also receives constants from the constant buffer of the constant buffer system 200, and may be further configured to perform various algorithms, such as tessellation, shadow volume generation, etc. The geometry shader 306 then outputs information to a rasterizer 308, which is responsible for clipping, primitive setup, and determining when and/or how to invoke the pixel shader 310. The pixel shader 310 is invoked for each pixel covered by the primitive that is output by the rasterizer 308. The pixel shader 310 also receives constants from the constant buffer of the constant buffer system 200, and operates to perform interpolations and other operations that collectively determine pixel colors for output to a write-back unit in memory 312. The functioning operation of the various components illustrated in FIG. 3 are orchestrated through a set of state registers configuring fixed function graphics hardware units and the computational core 204, as is described below.

Figure 4:
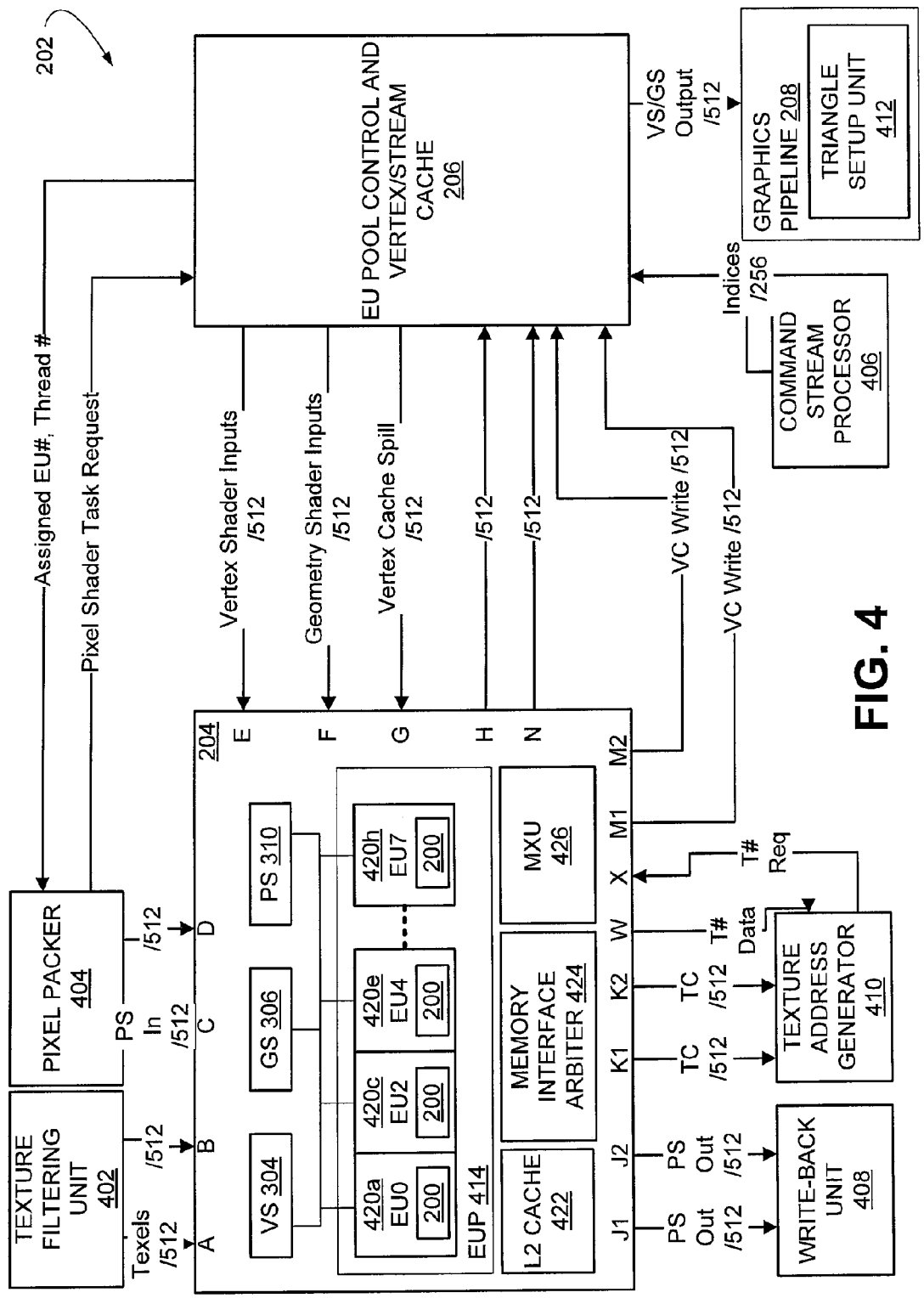
FIG. 4 is a block diagram that illustrates select components of the exemplary processing environment shown in FIG. 2.

Having described components that generate tasks for execution units in the computational core 204, reference is now made to FIG. 4, which is a block diagram showing an example graphics processor 202. While not all components for graphics processing are shown, the components shown in FIG. 4 should be sufficient for one having ordinary skill in the art to understand the general functions and architecture related to such graphics processors. At the center of the programmable processing environment is the computational core 204, which processes various instructions and includes the CB system 200. Various types of shader programs can be executed or mapped to the computational core 204, including the vertex shader 304, geometry shader 306, and pixel shader 310. That computational core 204, for multi-issue processors, is capable of processing multiple instructions within a single clock cycle.

As shown in FIG. 4, the relevant components of the graphics processor 202 comprise the computational core 204, a texture filtering unit 402, a pixel packer 404, a command stream processor 406, a write-back unit 408, and a texture address generator 410. Also included in FIG. 4 is the EU pool control unit 206, which also includes a vertex cache and/or a stream cache. As shown in FIG. 4, the texture filtering unit 402 provides texel data to the computational core 204 (inputs A and B). For some embodiments, the texel data is provided as 512-bit data. The pixel packer 404 provides pixel shader inputs to the computational core 204 (inputs C and D), also in 512-bit data format. Additionally, the pixel packer 404 requests pixel shader tasks from the EU pool control unit 206, which provides an assigned EU number and a thread number to the pixel packer 404. Since pixel packers and texture filtering units are known in the art, further discussion of these components is omitted here. While FIG. 4 shows the pixel and texel packets as 512-bit data packets, it should be appreciated that the size of the packets can be varied for some embodiments, depending on the desired performance characteristics of the graphics processor 202.

The command stream processor 406 provides triangle vertex indices to the EU pool control unit 206. In the embodiment of FIG. 4, the indices are 256-bits. The EU pool control unit 206 assembles vertex shader inputs from the stream cache and sends data to the computational core 204 (input E). The EU pool control unit 206 also assembles geometry shader inputs and provides those inputs to the computational core 204 (input F). In general, the EU pool control unit 206 controls the respective inflow and outflow to the computational core 204.

Upon processing, the computational core 204 provides pixel shader outputs (outputs J1 and J2) to the write-back unit 408. The pixel shader outputs include color information, such as red/green/blue/alpha (RGBA) information, which is known in the art. The pixel shader output may be provided as two 512-bit data streams. Other bit-widths may also be implemented in some embodiments.

In similar manner to the pixel shader outputs, the computational core 204 outputs texture coordinates (outputs K1 and K2), which include UVRQ information, to the texture address generator 410. The texture address generator 410 issues a texture descriptor request (T# Req) to an L2 cache 422 of the computational core 204 (input X), and the L2 cache 422 of the computational core 204 outputs (output W) the texture descriptor data (T# data) to the texture address generator 410. The L2 cache 422 and the EU pool control unit 206 also transfer to each other 512-bit vertex cache spill data. Two 512-bit vertex cache writes are output from the computational core 204 (outputs M1 and M2) to the EU pool control unit 206 for further handling. Since the various examples of the texture address generator 410 and the write-back unit 408 are known in the art, further discussion of those components is omitted here. Again, while the UVRQ and the RGBA are shown as 512 bits, it should be appreciated that this parameter may also be varied for some embodiments. In the embodiment of FIG. 4, the bus is separated into two 512-bit channels, with each channel holding the 128-bit RGBA color values and the 128-bit UVRQ texture coordinates for four pixels.

The graphics pipeline 208 comprises fixed-function graphics processing functionality. Responsive to a command from the driver software 128, such as to draw a triangle, vertex information is passed to vertex shader 304 in the computational core 204 to implement vertex transformations. In particular, objects are transformed from object space to work space and/or screen space as triangles. The triangles are passed from the computational core 204 to a triangle set-up unit (TSU) 412 in the graphics pipeline 208, which assembles primitives, and also performs known tasks such as bounding box generation, culling, edge function generation, and triangle level rejections, among other known functions. The TSU 412 passes data to a span and tile generation unit of the graphics pipeline 208, which provides tile generation functionality, whereby the data objects are segmented into tiles (e.g., 8×8, 16×16, etc.) and passed to another fixed function unit configured to performs depth (e.g., z-value) processing, such as high level (e.g., where fewer bits are consumed than similar processing at a lower level) rejection of z-values. The z-values are passed back to the pixel shader 310 in the computational core 204 for the performance of pixel shader functionality based on received texture and pipelined data. The computational core 204 outputs processed values to destination units located in the graphics pipeline 208. The destination units are configured to perform alpha testing and stencil testing before values in various caches need to be updated.

The computational core 204 comprises an execution unit pool (EUP) 414, which in one embodiment comprises one or more execution units (EUs) 420$a$ through 420$h$ (collectively referred to herein as EUs 420). Each of the EUs 420 includes control logic and local memory, as described further below, and each EU 420 is capable of processing multiple instructions within a single clock cycle. Thus, the EU pool 414, at its peak, can process multiple threads simultaneously or substantially simultaneously. While eight (8) EUs 420 are shown or implied in FIG. 4 (labeled EU0 through EU7), it should be appreciated that the number of EUs need not be limited to eight, but may be greater or fewer in number for some embodiments. Each of the execution units 420 comprises an embodiment of the CB system 200, as explained further below. In some embodiments, fewer than all of the execution units 420 may incorporate the CB system 200. Further, in some embodiments, components of the CB system 200 may be distributed among one or more components of the graphics processor 202, including logic in the EU pool control unit 206.

The L2 cache 422 receives vertex cache spill (input G) from the EU pool control unit 206 and provides vertex cache spill (output H) to the EU pool control unit 206. Additionally, the L2 cache 422 receives texture descriptor T# requests (input X) from the texture address generator 410, and provides the texture descriptor T# data (output W) to the texture address generator 410 in response to the received request.

The computational core 204 also comprises a memory access unit (MXU) 426 that is coupled to the L2 cache 422 through a memory interface arbiter 424. The memory interface arbiter 424 provides a control interface to the local memory (e.g., frame buffer or local memory 106). The BIU 118 provides an interface to the system through, for example, a PCIE bus. The memory interface arbiter 424 and BIU 118 provide the interface between the memory and the L2 cache 422. For some embodiments, the L2 cache 422 connects to the memory interface arbiter 424 and the BIU 118 through the memory access unit 426. The memory access unit 426 translates virtual memory addresses from the L2 cache 422 and other blocks to physical memory addresses.

The memory interface arbiter 424 provides memory access (e.g., read/write access) for the L2 cache 422, fetching of instructions/constants/data/texture, direct memory access (e.g., load/store), indexing of temporary storage access, register spill, vertex cache content spill, etc.

Other components not shown but understood as present by those having ordinary skill in the art include crossbars or buses for the transfer of input and output data, registers, among other components, for processing by the various EUs 420.

The execution unit flow of the EU pool 414 generally comprises several levels, including a rendering context level, thread or task level, and an instruction or execution level. At any given time, there may be multiple (e.g., two are described as a non-limiting example in the present disclosure) rendering contexts allowed in each execution unit 420, with the contexts identified by the use of a one bit flag or other mechanisms. The rendering context (or rendering context information) is passed from the EU pool control unit 206 before tasks belonging to this context are commenced. The rendering context information may include shader type, number of input/output registers, instruction starting address, output mapping table, vertex identifier, and constants in a respective constant buffer. Each execution unit 420 of the EU pool 414 may store a plurality of tasks or threads (e.g., in some embodiments, thirty-two threads) at the same time. In one embodiment, each thread fetches an instruction according to a program counter.

The EU pool control unit 206 functions as a global scheduler for the tasks and assigns appropriate threads in the execution units 420 using a data-driven approach (e.g., vertex, pixel, geometry packets in the input). For instance, the EU pool control unit 206 assigns a thread to one of the empty thread slots in the respective execution unit 420 of the EU pool 414. Data fed by a vertex cache or other component or module (depending on the shader type) is placed in a common register buffer, after which execution of a thread may commence.

In general, an embodiment of the graphics processor 202 utilizes programmable vertex 304, geometry 306, and pixel shaders 310. Rather than implementing the functions or operations of these components as separate fixed function units with different designs and instruction sets, the operations are instead executed by the pool 414 of execution units 420a, 420b ... 420n with a unified instruction set. Each of these execution units 420 is identical in design and configurable for programmed operation. In one embodiment, each execution unit 420 is capable of multi-threaded operations simultaneously. As various shader tasks are generated by the vertex shader 304, geometry shader 306, and pixel shader 310, they are delivered to the respective execution units 420 to be carried out.

As individual tasks are generated, the EU pool control unit 206 handles the assigning of those tasks to available threads within the various execution units 420. As tasks are completed, the EU pool control unit 206 further manages the release of the relevant threads. In this regard, the EU pool control unit 206 is responsible for assigning vertex shader, geometry shader, and pixel shader tasks to threads of the various execution units 420, and also, performs an associated "bookkeeping" of the tasks and threads. Specifically, the EU pool control unit 206 maintains a resource table of threads and memories for all execution units 420. The EU pool control unit 206 particularly knows which threads have been assigned tasks and are occupied, which threads have been released after thread termination, how many common register file memory registers are occupied, and how much free space is available for each execution unit.

Accordingly, when a task is assigned to one execution unit (e.g., 420a), the EU pool control unit 206 will mark the thread as busy and subtract the total available common register file memory by the amount of the appropriate register file footprint for each thread. This footprint is set or determined by states for the vertex shader 304, geometry shader 306, and pixel shader 310. Further, each of the shader stages may have different footprint sizes. For example, a vertex shader thread may require ten (10) common register file registers, while a pixel shader thread may only require five such registers.

When a thread completes its assigned task(s), the execution unit 420 running the thread sends an appropriate signal to the EU pool control unit 206. The EU pool control unit 206, in turn, updates its resource table to mark the thread as free and to add the amount of total thread common register file space back to the available space. When all threads are busy or all the common register file memory has been allocated (or there is too little register space remaining to accommodate an additional thread), then the execution unit 420 is considered full and the EU pool control unit 206 will not assign any additional or new threads to that execution unit.

A thread controller is also provided inside each of the execution units 420, and this thread controller is responsible for managing or marking each of the threads as active (e.g., executing) or available.

Figure 5:
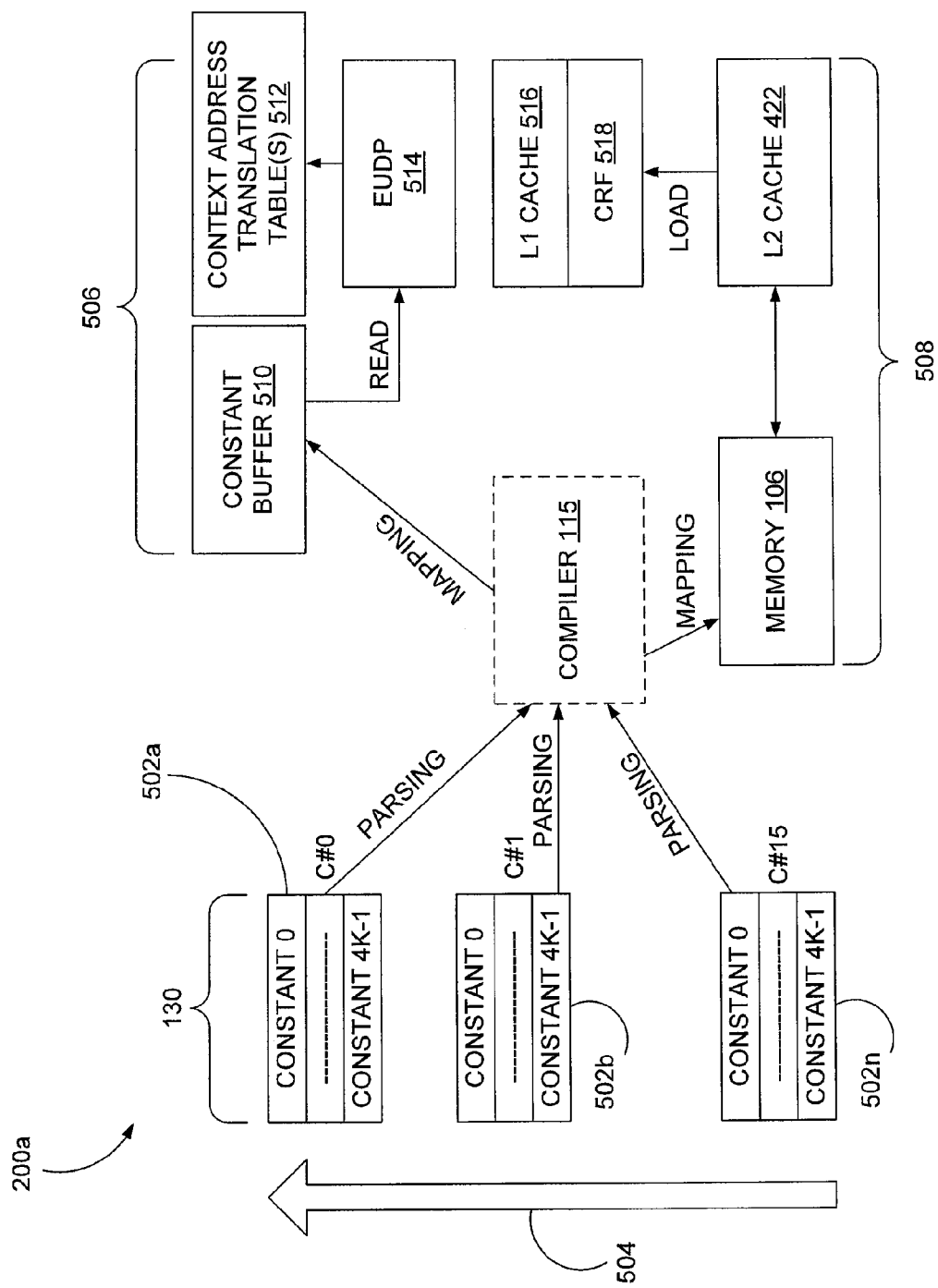
FIG. 5 is a schematic diagram that illustrates one method by a graphics processing unit (GPU) compiler for mapping constants from applications programming interface (API) space to GPU memory space and an internal (on-chip) constant buffer.

Having described the underlying architecture of an embodiment of the graphics processor 202, attention is now directed to the provision of constants from API space 130 to the CB system 200, and the management by the CB system 200 of the constants for multiple rendering contexts. In particular, FIG. 5 is a schematic diagram that graphically illustrates one exemplary method 200a for mapping constants from API space 130 to memory accessible to the CB system 200. The API space 130 comprises multiple constant blocks 502a through 502n (e.g., sixteen (16) shown as one exemplary embodiment), each block comprising in one embodiment 4000 (4K) constants. In one embodiment, each block 502 is identified by a constant block number (e.g., C#0, C#1, etc.), having a priority level 504 that increases with decreasing number (e.g., C#0 has a highest priority). The priority level 504 may be used to determine under which route (fast access path 506 or slow access path 508) the constant blocks are to be loaded (e.g., C#0 may be loaded to fast constant access path 506).

The fast access path 506 is implemented in the computational core EUs 420 (e.g., via an EU data path (EUDP, 514), described below) and provides fast access to constants (1 cycle delay). The fast access path 506 includes operations involving the constant buffer 510 and context address translation table(s) 512 (described further below) simultaneously running multiple contexts.

The slow access path 508 is implemented using off-chip memory (e.g., memory 106) and the L2 cache 422, and constants can be loaded to a register file through a memory hierarchy. The access to constants along the slow access path 508 may take several cycles.

The GPU compiler 115 maps constants to the fast access path 506 and/or the slow constant access path 508 according to one or more rules. For instance, for non-indexable constants of a limited number with sufficient space allocated in the on-chip constant buffer 510, the compiler 115 maps such constants via the fast access path 506. For indexable constants, the compiler 115 maps such constants along the slow access path 508. For large, non-indexable constant blocks, the compiler 115 may split the routing between the slow access path 508 and the fast access path 506.

Figure 6A:
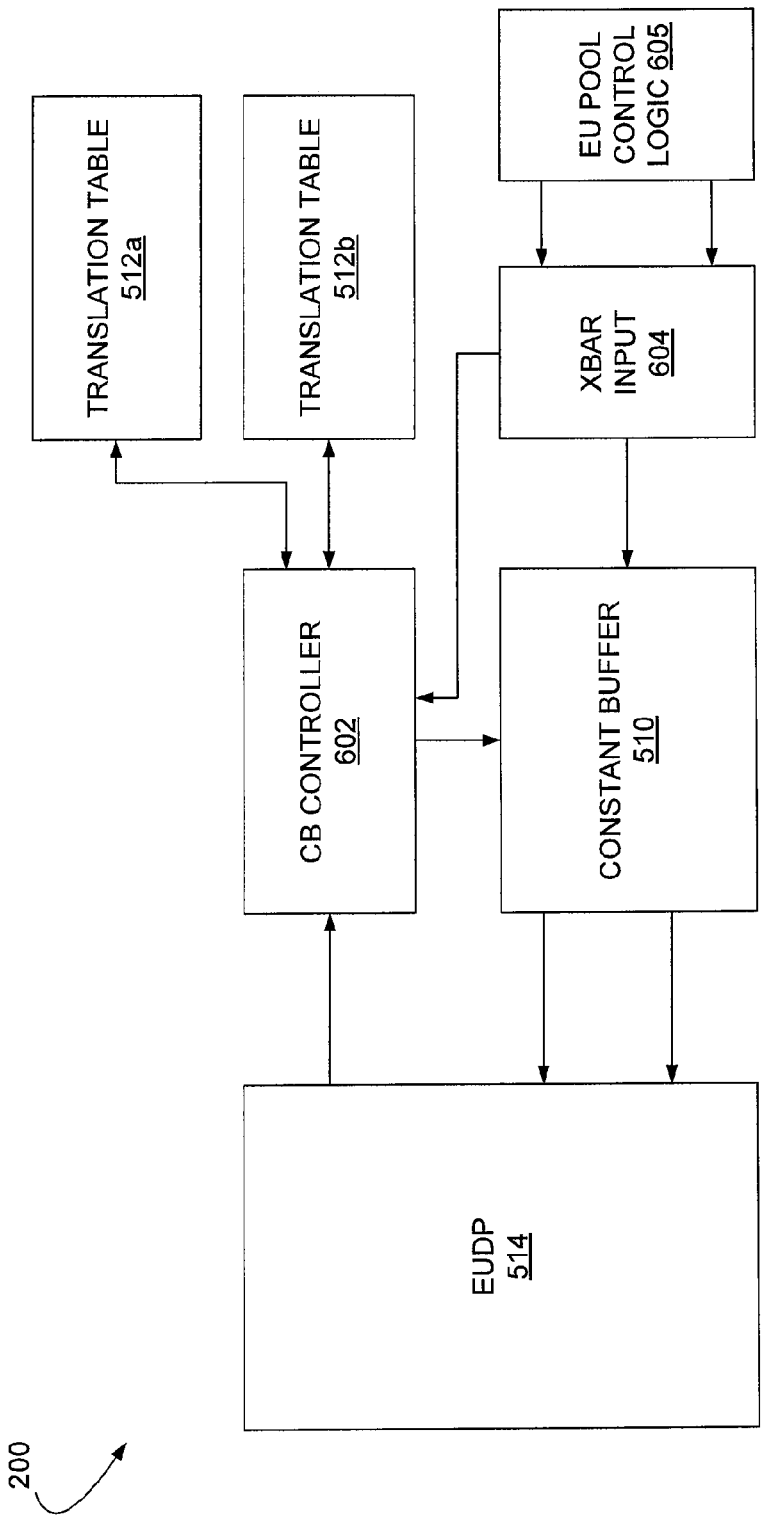
FIGS. 6A-6B are block diagrams that illustrates select components of a CB system embodiment.
Figure 6B:
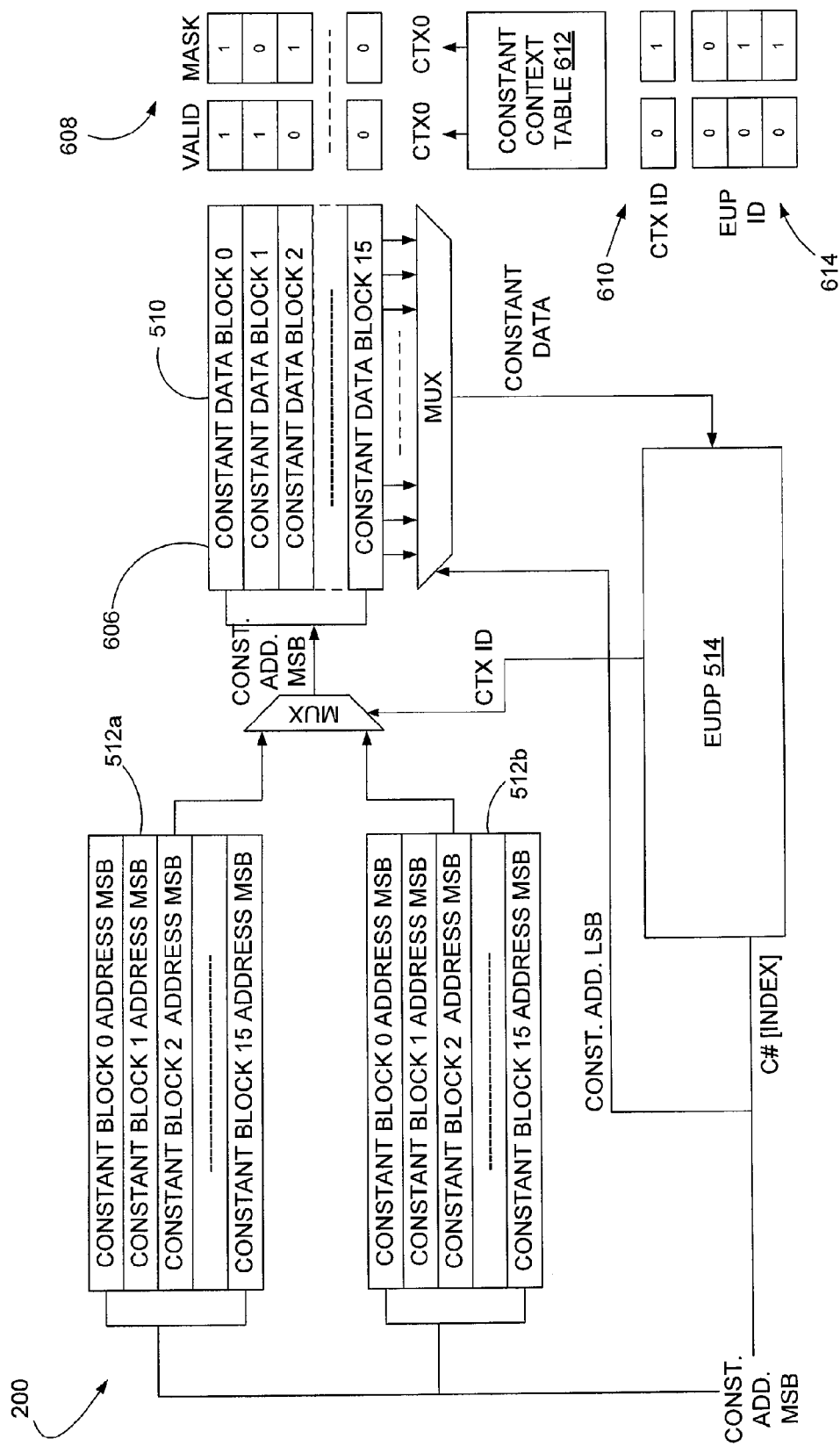

In the context of the aforementioned described environment, what follows is an explanation of an embodiment of the CB system 200, as shown collectively in FIGS. 6A-6B. In one embodiment, the CB system 200 comprises the execution unit data path (EUDP) 514, a constant buffer (CB) controller 602, the constant buffer 510, two context address translation tables 512a, 512b, an input interface (crossbar or xbar) 604, and an EU pool control logic 605. Though shown using two translation tables 512a, 512b corresponding to two rendering contexts, certain embodiments of CB systems 200 may have a different number of context translation tables 512 corresponding to the same or different quantities of rendering contexts. The input interface 604 can be configured as a crossbar or bus or the equivalent as should be appreciated by one having ordinary skill in the art in the context of the present disclosure.

The EUDP 514 comprises arithmetic logic units and other logic corresponding to functionality pertaining to instruction decoding, operand fetch, branch computation, instruction execution, shift/logic, load/store, among other processing functionality or logic. The constant buffer 510 is coupled via two ports (e.g., two (2) 128-bit read ports) to the EUDP 514 and one port (e.g., one (1) 512-bit write port) to the input interface 604. The CB controller 602 is coupled to the EUDP 514, context address translation tables 512a, 512b, constant buffer 510, and input interface 604.

The constant buffer 510 in one embodiment is divided up into a plurality of blocks (e.g., data block 606 in FIG. 6B, each labeled respectively as "constant data block 0," constant data block 1," etc.), with each block 606 comprising a plurality of slots for storage of constants. For instance, in one embodiment, the constant buffer 510 may be configured as a 256×128 2R1W buffer divided up into sixteen (16) blocks 606, with each block 606 comprising sixteen (16) slots having sixteen (16) 128-bit horizontal vector constants. In one embodiment, "free" or available (e.g., writeable) data slots in each block 606 of the constant buffer 510 are assigned for the loading of new constants. Generally, shader program processing for a particular rendering context may use fewer than the designated slots, and thus the free space can be used to load the new constants related to another rendering context. The multicontext address translation tables 512a, 512b are updated with the location of the new constant(s), identified or indexed using the new context shader program (EU Pool or shader ID 614). In other words, the context translation tables 512a, 512b maintain a physical index of the constants addressed in shader program context identifiers. The context address translation tables 512a, 512b translate the logical index to a physical address in the constant buffer 510. Each rendering context has its own address translation table (e.g., context 0 address translation table 512a for a first rendering context and context 1 address translation table 512b for a second rendering context), which maps logical shader constant space (e.g., API space 130) to a physical location in the constant buffer 510 for the constants. In one embodiment, the context address translation tables 512a, 512b comprise sixteen (16) entries of 4-most significant bits (MSBs) of a constant buffer physical address. Any actual context can be shared between two or more contexts using special valid mask tags 608.

As described above, there exists a plurality of slots (e.g., sixteen (16)) per block 606 in the constant buffer 510 that can be active per shader pipeline stage (e.g., vertex shader 304, geometry shader 306, or pixel shader 310). In one embodiment, for constants mapped to the constant buffer 510, the indexing across constant buffer slots is not permitted while indexing inside the slot is possible if the indexing range does not exceed the slot size.

A given constant buffer slot number, indexable constant c#, is accessed as an operand to any shader operation as if it is an indexable read-only register in the shader. In shader code, c# registers are generally declared with semantic names, and the names in the shader are matched with the names on constant buffer slots outside the shader. A c# register is a placeholder for a constant buffer slot. A constant buffer slot is accessed in a shader in one embodiment using the following syntax:

c#[index] as an operand to shader instructions,   (1)

where "index" can include a temporary register containing, for instance, a 32-bit unsigned integer, an immediate 32-bit unsigned integer constant, among others. For example, in the following pseudo code, "mov r0, c3[6]," the operation comprises moving element 6 from the constant buffer slot 3 into r0.

The declaration of a constant buffer slot (c# register) in a shader includes the following information and/or process: (a) a declaration of the size of the constant buffer 510 (e.g., a special flag allows for unknown-length); (b) the shader indicates whether the constant buffer 510 is to be accessed via shader-computed offset values or only by literal offsets; and (c) the order that the declaration of a c# appears in a shader, relative to other c# declarations, defines the priority of that constant buffer slot, starting at highest priority. In one implementation, out of bounds access to the constant buffer 510 may result in the value of zero (0) being returned.

The priorities assigned to the constant buffer slots assist hardware in best utilizing any dedicated constant data access paths/mechanisms, if present. In some implementations, there is no guarantee that access to constant buffer slots with higher priority will always be faster than lower priority constant buffer slots. For instance, it is possible that a higher priority constant buffer slot can produce slower performance than a lower priority constant buffer slot, depending on the declared characteristics of the buffers involved. For example, an implementation may have some arbitrarily-sized fast constant RAM not large enough for a couple of high priority constant buffer slots that a shader has declared, but large enough to fit a declared low priority constant buffer slot. Such an implementation may have no choice but to use the standard texture or memory load path for large, high priority constant buffer slots (perhaps tweaking the cache behavior), while placing the lowest priority constant buffer slot into the (assumed fast) constant RAM.

In one embodiment of the CB system 200, a total of 256 constants per shader pipeline stage may be loaded to the constant buffer 510. Given sixteen (16) slots per sixteen (16) blocks, the constants are divided into groups of sixteen (16). Thus, there may be two contexts running on one execution unit 420 at once during a transition from one context to another context. In one embodiment, the total number of constants between the two (2) contexts is not to exceed 256. If the constants of both contexts exceed 256 (or whatever maximum prescribed number of slots for a given constant buffer implementation), the EU pool control logic 605 (i.e., based on directions in the shader code, the compiler 115 arranges the hardware of the EU pool control logic 605 to provide the requisite loading functionality) does not load the second context until the previous one is completed. Note that in some embodiments, the compiler 115 does not need to be aware of this situation, though the compiler 115 may allocate fewer constants in the constant buffer 510 for a given shader if the compiler had specific knowledge of what combinations of shaders ran together in a specific application.

The compiler 115 declares which constants to preload into the constant buffer 510 with declarations. For instance, one declaration may provide that block 4 (constants 64 to 79) of the constant buffer 510 uses C#10 offset 16 to 31 from the API space 130. This declaration is interpreted as requiring that constants 64 through 79 will be from C#10 constants 16 through 31. In one implementation, all blocks of a shader constant slot (C#) are loaded into the constant buffer 510 at substantially the same time to ensure proper indirect addressing operations.

The EU pool control logic 605 preloads the constant buffer 510 according to the shader declarations before starting up the context on a given execution unit 420. The EU pool control logic 605 also resolves where to put constants from two different contexts and loads the context address translation tables 512a, 512b. The EU pool control logic 605 also tracks which sixteen (16) constant slots are in use with valid mask bits 608. In one implementation, if the constant buffer 510 cannot be completely loaded for a new context, the EU pool control logic 605 does not start the new context until the old one is completed.

To locate a constant in the constant buffer 510, the CB controller 602 uses the context address translation tables 512a, 512b. In one embodiment, when provided with a constant index (e.g., an 8-bit constant index), the CB controller 602 uses the context ID 610 (e.g., 1-bit) of the requesting thread to select one of two 16×4-bit context address translation tables (512a, 512b) and takes the 4 most significant bits (MSB) of the constant index c# [index] to look up the top 4-bits of a constant physical buffer index and adds in the low 4 bits (LSB) of the constant number. If two reads per instruction are performed, for instance, two constants are used as two sources in the instruction (e.g., ADD dst, c#[index1], c#[index2]).

As previously described, the CB system 200 enables two or more constant contexts to run simultaneously if both contexts can be accommodated into the constant buffer 510. For instance, the constants can be shared between two consecutive contexts of the same shader pipeline stage, thus enabling small constant changes to be updated without reloading the entire constant buffer 510. Whenever the primary constant context finishes in a given execution unit 420, the secondary context is swapped into the primary slot and the EU pool control logic 605 starts to push a set of constants for the next available context update into the released secondary context slot.

Figure 7:
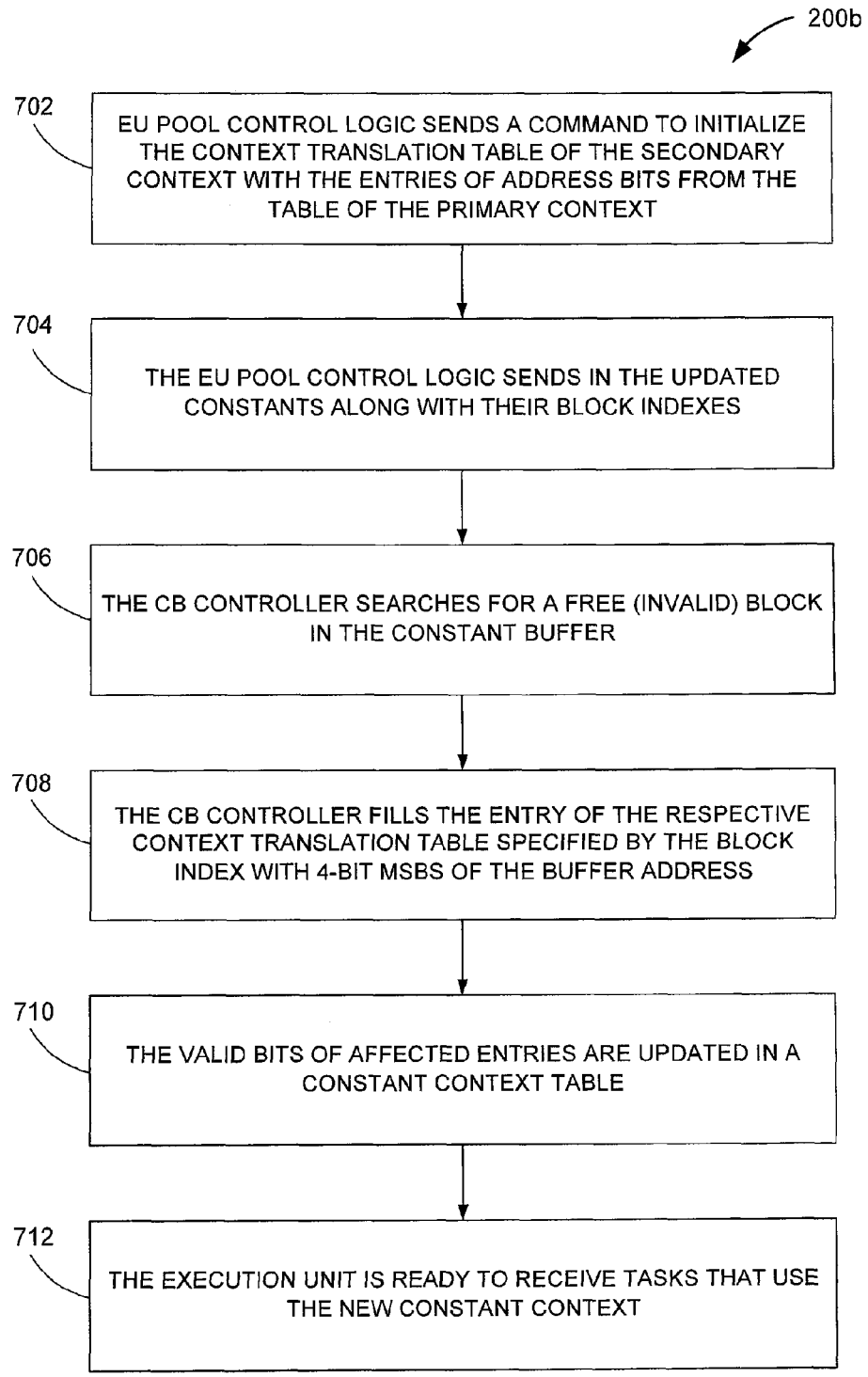
FIG. 7 is a flow diagram that illustrates an embodiment of a CB method.

Having described various features of an embodiment of the CB system 200, a corresponding constant buffer method 200b, illustrated in FIG. 7, can be described as follows. The EU pool control logic 605 sends a command to initialize the context address translation table (512a, 512b) of the secondary context with the entries of address bits from the table (512a, 512b) of the primary context (702). The EU pool control logic 605 sends the updated constants along with their block indexes (704). The CB controller 602 searches for a free (invalid) block 606 in the constant buffer 510 (706) and fills the entry of the respective context address translation table 512a, 512b specified by the block index with 4-bit MSBs of the buffer address (708). The valid mask bits 608 of affected entries are updated in a constant context table 612 (710). The valid mask bits 608 comprise one bit for each context, and hence, two or more valid mask bits 608 per constant data block 606 are located in the constant context table 612 (comprising in one embodiment an EU constant memory array) and attached as a tag to each data block 606. For example, for sixteen (16) data blocks 606 in the constant buffer 510, there exists a 16×2 bit tag. Then, the execution unit 420 is ready to receive tasks that use the new constant context (712).

Figure 8:
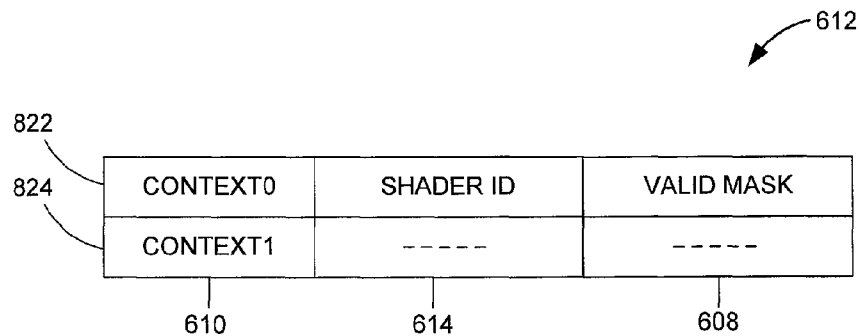
FIG. 8 is a block diagram that further illustrates a constant context table as shown in FIG. 6B.

FIG. 8 illustrates one embodiment of a constant context table 612. The constant context table 612 comprises two entries 822 and 824, each including a one (1)-bit context ID 610, a three (3)-bit EU pool shader context ID 614, and a sixteen (16)-bit constant buffer valid mask 608. The 3-bit EU Pool shader context ID 614 identifies the shader pipeline stage and constant context at the EU pool 414. The 16-bit valid mask 608 specifies the valid constant block entries of the current context.

When a new context is created in an execution unit 420, the EU pool control logic 605, using the constant context table 612, sends a command to initialize the translation tables 512a, 512b as well as providing the valid mask 608 of the secondary context in the constant context table 612 with the primary context slot. After a block of updated constants arrives in the execution unit 420, the CB controller 602 takes the index that comes along with it to look up the 4 MSBs of the buffer address in the context address translation table 512a, 512b and uses the address to locate the valid mask bit 608 in the constant context table 612 and mark it as invalid. After that, a free block slot is selected in the constant buffer 510 and the 4 MSBs of the buffer address are recorded at the location specified by the above constant index in the context address translation table 512a, 512b. With the same 4 MSBs, the appropriate bit in the valid mask 608 of the current context is marked as valid.

Figure 9A:
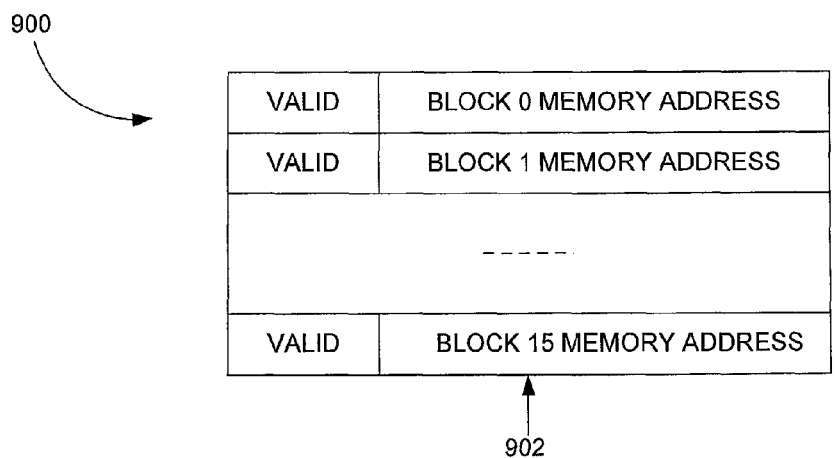
FIGS. 9A-9B are block diagrams that illustrate various tables used by logic in the CB system shown in FIGS. 6A-6B.
Figure 9B:
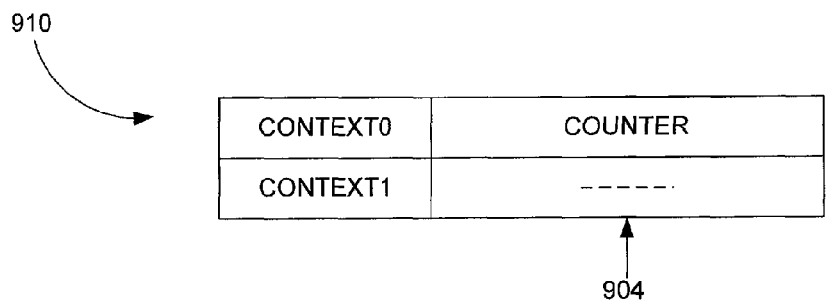

FIGS. 9A and 9B comprise tables used by or integrated with the EU pool control logic 605. The EUP constant address table 900 of FIG. 9A comprises twelve (12)-bit memory addresses 902 for constant blocks located in memory and provides the address for constant data loading from the memory 106 to on-chip constant buffers 510 located in EUs 420 of computational core 204. When a new constant update is received from the command stream processor (CSP) 406 or pixel packer 404, the EU pool control logic 605 checks if the secondary context of the corresponding shader stage is available to take the constant update.

With regard to FIG. 9B, a constant reference table 910 is illustrated comprising reference counters 904 for constant usage by shader program instances for contexts. Such reference counters 904 are incremented when a new instance is loaded to an EU 420 and decremented when the shader instance terminates. In particular, the counter 904 in the constant reference table 910 keeps track of the number of outstanding tasks for a given shader constant context. When a new task is created, the counter 904 in the constant reference table 910 is incremented, and when a task finishes, the counter 904 is decremented. When the counter 904 reaches zero, the EU pool control logic 605 is notified that all tasks for the context have completed and the EU pool 414 is flushed. When the primary constant context gets flushed out of the EU pool 414, the secondary context is swapped into the primary slot and the secondary slot is made available to take the next update from CSP 406 or pixel packer 404. When a task is scheduled to an execution unit 420, the shader constant context ID 610 associated with the task is compared with the active context IDs for the target execution unit 420. If there is a match, the task is sent to the target execution unit 420, otherwise, a constant load process is triggered to pre-load constants into the target execution unit.

Any process descriptions or blocks in flow diagrams described herein should be understood as representing modules, segments, or portions of code which include one or more executable instructions for implementing specific logical functions or steps in the process, and alternate implementations are included within the scope of the embodiments of the disclosed systems and methods in which functions may be executed out of order from that shown or discussed, including substantially concurrently or in reverse order, depending on the functionality involved, as would be understood by those reasonably skilled in the art.

It should be emphasized that the above-described embodiments of the present invention, particularly, any "preferred" embodiments, are merely possible examples of implementations, merely set forth for a clear understanding of the disclosed principles. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A graphics processing system, comprising:
   a plurality of execution units, wherein one of the execution units is configurable to process a thread corresponding to a rendering context, wherein the rendering context comprises a plurality of constants with a priority level;
   a constant buffer configurable to store the constants of the rendering context into a plurality of slot in a physical storage space;
   an execution unit control unit configurable to assign the thread to one of the execution units; and
   a constant buffer control unit providing a translation table for the rendering context to map the corresponding constants into the slots of the physical storage space.

2. The graphics processing system of claim 1, wherein the physical storage space comprises a memory and a cache.

3. The graphics processing system of claim 2, wherein the constant buffer control unit loads a first group of the constants from the memory into the cache in responsive to the priority level of the constants and an assignment of the execution unit control unit.

4. The graphics processing system of claim 1, wherein the thread is a stage of a vertex shader operation, a geometric shader operation or a pixel shader operation.

5. The graphics processing system of claim 1, wherein the translation table comprises an address index corresponding to the slots of the physical storage space and a logic index corresponding to the rendering context.

6. The graphics processing system of claim 5, wherein the address index is the most significant bits of an address of the slot in the physical storage space.

7. The graphics processing system of claim 1, wherein a first execution unit of the execution units is configurable to process a first thread corresponding to the rendering context and a second execution unit of the execution units is configurable to process a second thread corresponding to the rendering context simultaneously.

8. The graphics processing system of claim 1, wherein a first execution unit and a second execution unit share a common constant by accessing the same slot of the physical storage space.

9. A method for managing a constant buffer in a graphics processing unit, comprising:
   receiving a plurality of shader operations by the graphics processing unit, each of the shader operations corresponds to a rendering context, wherein the rendering context comprises a plurality of constants;
   translating the graphics shader operations into a plurality of threads by the graphics processing unit, each thread executable by the graphics processing unit;
   transmitting the constants into a physical storage space of the graphics processing unit;
   generating a translation table for the rendering context to map the constants into the physical storage space of the graphics processing unit by the graphics processing unit; and
   executing the threads by the graphics processing unit, wherein the constants necessary for the execution of the threads are accessible from the physical storage space through the translation table.

10. The method of claim 9, wherein the physical storage space comprises a memory and a cache.

11. The method of claim 10, further comprising:
    loading a first group of constants from the memory into the cache in response to a priority level of the constants.

12. The method of claim 9, wherein at least one of the shader operations is a vertex shader operation, a geometric shader operation, or a pixel shader operation.

13. The method of claim 9, wherein the translation table comprises an address index corresponding to the physical storage space and a logic index corresponding to the rendering context.

14. The method of claim 9, wherein the graphics processing unit comprises a plurality of execution units, a first execution unit configurable to execute one of the threads and a second execution unit configurable to execute another of the threads simultaneously.

15. The method of claim 14, wherein the execution units of the graphics processing unit are configurable to share at least one part of the physical storage space.

* * * * *